US009817518B2

(12) United States Patent
Huang et al.

(10) Patent No.: US 9,817,518 B2
(45) Date of Patent: Nov. 14, 2017

(54) OPTIMIZATION FOR HOST BASED TOUCH PROCESSING

(71) Applicant: QUALCOMM Incorporated, San Diego, CA (US)

(72) Inventors: William Yee-Ming Huang, Vista, CA (US); Mohamed Imtiaz Ahmed, San Marcos, CA (US); Hsun Wei David Wong, San Diego, CA (US); Raghukul Tilak, San Diego, CA (US); Qiang Gao, San Diego, CA (US); Suhail Jalil, Poway, CA (US); Teresa Ka Ki Ng, San Diego, CA (US); Carol King Mui Law, San Diego, CA (US); Rex Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/094,248

(22) Filed: Apr. 8, 2016

(65) Prior Publication Data
US 2016/0224187 A1    Aug. 4, 2016

Related U.S. Application Data

(63) Continuation of application No. 14/540,894, filed on Nov. 13, 2014, now Pat. No. 9,310,933.
(Continued)

(51) Int. Cl.
*G06F 3/041* (2006.01)
*G06F 3/044* (2006.01)

(52) U.S. Cl.
CPC ............ *G06F 3/0418* (2013.01); *G06F 3/044* (2013.01); *G06F 3/0416* (2013.01)

(58) Field of Classification Search
CPC ...... G06F 3/041; G06F 3/0418; G06F 3/0488; G06F 2203/04104
See application file for complete search history.

(56) References Cited

U.S. PATENT DOCUMENTS 8,031,175 B2   10/2011   Rigazio et al.
8,269,511 B2    9/2012   Jordan
(Continued)

FOREIGN PATENT DOCUMENTS

CN   102483673 A   5/2012
CN   102576272 A   7/2012
(Continued)

OTHER PUBLICATIONS

International Search Report—PCT/US2015/016670—ISA/EPO—Jun. 3, 2015.

*Primary Examiner* — Joe H Cheng
(74) *Attorney, Agent, or Firm* — Knobbe, Martens, Olson & Bear, LLP

(57) ABSTRACT

Systems and methods are disclosed for determining a touch position from data received from a touch panel. In one implementation, an apparatus for processing a touch input signal includes a processor that may be configured for parallel processing, a touch device, a memory, operably connected to the processor, and configured to store processor instructions. The processor instructions can configure the processor to receive a plurality of data points corresponding to a plurality of touch events on the touch device, determine a center of mass estimate from the plurality of data points, determine a search radius of center of mass estimate, and determine an optimal touch point position based on the center of mass estimate and the search radius using the processor.

21 Claims, 13 Drawing Sheets

Related U.S. Application Data

(60) Provisional application No. 61/944,971, filed on Feb. 26, 2014.

(56) References Cited

U.S. PATENT DOCUMENTS

| | | |
|---|---|---|
| 8,436,828 B1 | 5/2013 | Zhai |
| 2010/0073318 A1 | 3/2010 | Hu et al. |
| 2011/0084857 A1 | 4/2011 | Marino et al. |
| 2011/0102351 A1 | 5/2011 | Seo |
| 2012/0206377 A1 | 8/2012 | Zhao et al. |
| 2013/0016045 A1 | 1/2013 | Zhao et al. |
| 2015/0049063 A1 | 2/2015 | Smith et al. |
| 2015/0242050 A1 | 8/2015 | Huang |

FOREIGN PATENT DOCUMENTS

| | | |
|---|---|---|
| CN | 104081328 A | 10/2014 |
| KR | 20120044359 A | 5/2012 |

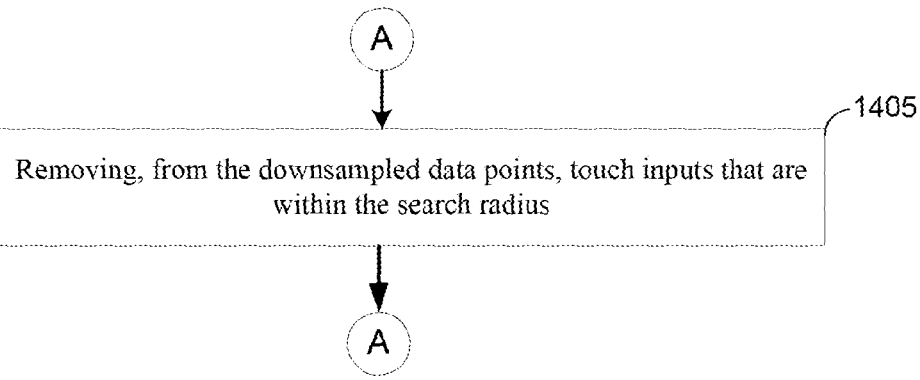
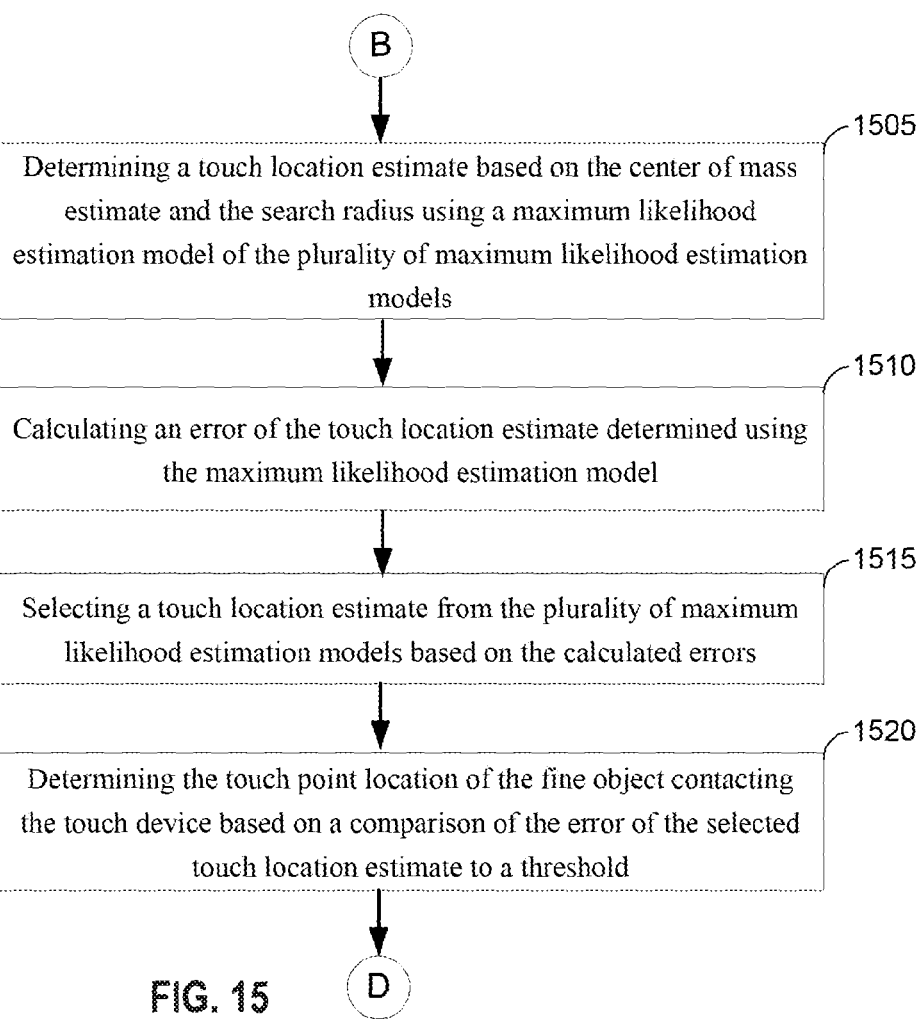

OPTIMIZATION FOR HOST BASED TOUCH PROCESSING

CROSS REFERENCE TO RELATED APPLICATIONS

This Application is a continuation of U.S. application Ser. No. 14/540,894, titled "OPTIMIZATION FOR HOST BASED TOUCH PROCESSING," filed Nov. 13, 2014, now U.S. Pat. No. 9,310,933, which claims the benefit of U.S. Provisional Application No. 61/944,971, titled "OPTIMIZATION FOR HOST BASED TOUCH PROCESSING," filed Feb. 26, 2014, each of which is incorporated by reference herein in its entirety.

TECHNICAL FIELD

The systems and methods disclosed herein are directed to touch processing, and more particularly, to coarse and fine object touch processing.

BACKGROUND

For touch location estimation, some touch algorithm may treat capacitive panel measurements as point mass of a two dimensional (2D) touch "probe," and apply a center of mass estimation (centroid) to find the location of the touching probe. For shape estimation, some processes treat the capacitive touch panel measurements as pixel values. The center of mass computation can be sub-optimal and subject to aliasing, which may cause bias and high jitter. For shape accuracy, a low pixel density makes it very difficult, if not impossible, to obtain accurate shape parameters, for example, angle of rotation and area. Accordingly, improvements and optimization in touch processing are desired.

SUMMARY OF CERTAIN INVENTIVE ASPECTS

The systems, methods and devices of the disclosure each have several innovative aspects, no single one of which is solely responsible for the desirable attributes disclosed herein.

One innovation includes an apparatus for processing a touch input signal, the apparatus including at least one processor, a touch device in communication with the processor, and a memory component (also referred to herein for ease of reference as "memory") operably connected to the processor and configured to store processor instructions. The at least one processor may be configured for parallel processing. The processor instructions configure the processor to receive a plurality of data points corresponding to a plurality of touch events on the touch device, determine a center of mass (centroid) estimate from the plurality of data points, determine a search radius of center of mass estimate, and determine an optimal touch point position based on the center of mass estimate and the search radius using the processor in a parallel processing configuration.

Another innovation includes an apparatus for processing a touch input signal, the apparatus including at least one processor that may be configured for parallel processing, a touch device, and memory operably connected to the processor and configured to store processor instructions that configure the processor to receive a plurality of data points corresponding to a plurality of touch events on the touch device, downsample the plurality of data points, determine a center of mass estimate for coarse objects from the plurality of data points, remove the coarse objects from the downsampled plurality of data points and output a coarse object estimate, detect fine objects using the plurality of data points and the downsampled plurality of data points with the coarse object removed and produce a fine object output, and output an optimal fine object estimate based on the fine object output and high resolution data received from requested regions of the touch panel using the processor in a parallel processing configuration.

One innovation is a method of processing a touch input signal, the method including receiving a plurality of data points corresponding to a plurality of touch events on the touch device, determining a center of mass estimate from the plurality of data points, determining a search radius of center of mass estimate, and determining an optimal touch point position based on the center of mass estimate and the search radius using the processor in a parallel processing configuration.

Another innovation includes a method of processing a touch input signal, the method including receiving a plurality of data points corresponding to a plurality of touch events on the touch device, downsampling the plurality of data points, determining a center of mass estimate for coarse objects from the plurality of data points, removing the coarse objects from the downsampled plurality of data points and output a coarse object estimate, detecting fine objects using the plurality of data points and the downsampled plurality of data points with the coarse object removed and producing a fine object output, and outputting an optimal fine object estimate based on the fine object output and high resolution data received from requested regions of the touch panel using the processor in a parallel processing configuration.

Another innovation includes a non-transitory, computer readable storage medium having instructions stored thereon that cause a processing circuit to perform a method comprising receiving a plurality of data points corresponding to a plurality of touch events on the touch device, determining a center of mass estimate from the plurality of data points, determining a search radius of center of mass estimate, and determining an optimal touch point position based on the center of mass estimate and the search radius using the processor in a parallel processing configuration.

Another innovation includes a non-transitory, computer readable storage medium having instructions stored thereon that cause a processing circuit to perform a method comprising receiving a plurality of data points corresponding to a plurality of touch events on the touch device, downsampling the plurality of data points, determining a center of mass estimate for coarse objects from the plurality of data points, removing the coarse objects from the downsampled plurality of data points and output a coarse object estimate, detecting fine objects using the plurality of data points and the downsampled plurality of data points with the coarse object removed and producing a fine object output, and outputting an optimal fine object estimate based on the fine object output and high resolution data received from requested regions of the touch panel using the processor in a parallel processing configuration.

Another innovation includes an apparatus for processing a touch input signal, means for receiving a plurality of data points corresponding to a plurality of touch events on the touch device, means for determining a center of mass estimate from the plurality of data points, means for determining a search radius of center of mass estimate, and means for determining an optimal touch point position based on the center of mass estimate and the search radius using the processor in a parallel processing configuration.

BRIEF DESCRIPTION OF THE DRAWINGS

The disclosed aspects will hereinafter be described in conjunction with the appended drawings and appendices, provided to illustrate and not to limit the disclosed aspects, wherein like designations denote like elements.

FIG. 14 is a block diagram that illustrates certain features of a process of determining a touch point location of a fine object contacting the touch device, the process relating to the method of FIG. 13.

FIG. 15 is a block diagram that illustrates certain features of a process of determining a touch point location of a fine object contacting the touch device, the process relating to the method of FIG. 13.

DETAILED DESCRIPTION OF CERTAIN EMBODIMENTS

Optimized touch detection processes can have far better performance than conventional sensing algorithms. The results of optimized touch detection processes can include higher accuracy, unbiased off-edge estimate, lower bias, lower jitter, and more precise shape estimation. However, many of these "optimized" processes are not suitable for implementation by conventional touch controller microprocessor, but are instead ideally suited for host based touch processing system. The embodiments described herein may replace the current touch controller processes using optimized signal processing techniques and produce better touch detection on a touch panel. In addition, such techniques also can provide power savings on current touch panel hosting device.

For touch location estimation, conventional touch algorithms treat capacitive panel measurements as a point mass of a two dimensional (2D) touch probe, and apply center of mass estimation to find the location where a hypothetical fulcrum can be placed to balance the touching "probe." A second view of the conventional algorithm is that of a "centroid," a cluster of points around a centroid location. For shape estimation it treats the capacitive touch panel measurements as pixel values in a digital camera, with pixel located typically 4 mm's apart for many touch panels. The center of mass computation, or the centroid computation, is suboptimal and subject to aliasing, which can cause bias and high jitter. Additionally, for shape accuracy, the low pixel density (4 mm) makes it almost impossible to obtain accurate shape parameters, such as angle of rotation and area of a touch.

Performance advantages of the embodiments described herein include increased touch accuracy, improved touch stroke linearity, reduced jitter (variance of estimate), reduced bias, and improved accuracy of shape feature estimates. Some implementation advantages may include reduced power consumption, and more suitability for parallel processing as found on current touch panel hosting devices such as cell phones and tablets. Examples of parallel processors include NEON array processor, DSP and OpenCL-enabled graphics engines. In some implementations, at least two processors or processing cores can be operated as parallel processors. In some implementations, certain techniques described herein are advantageously operated on a processor configured for parallel processing (for example, faster processing).

Figure 1:
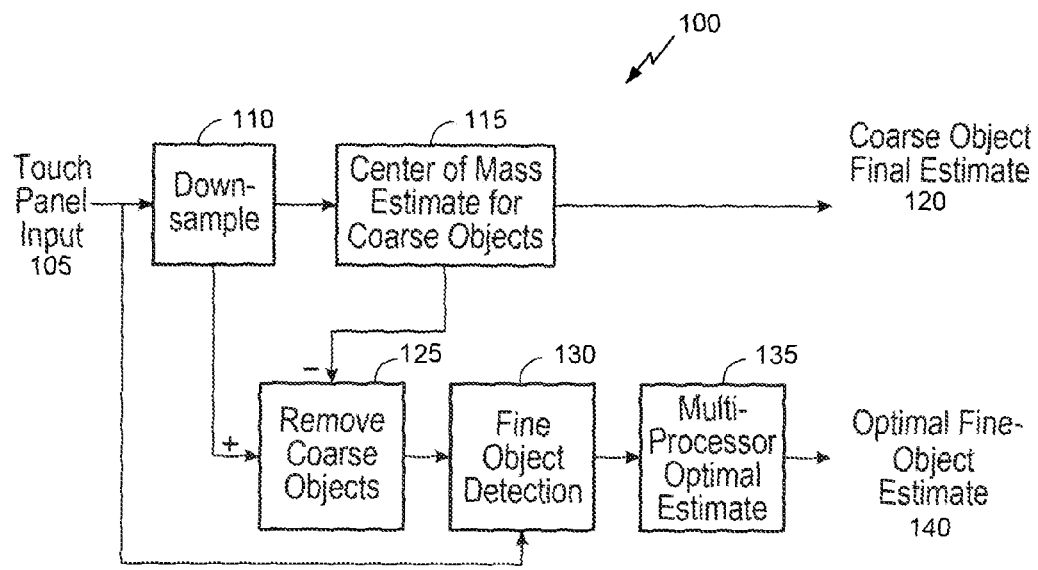
FIG. 1 is a schematic that illustrates an example implementation of an optimal touch estimate system, for example, on a host-based parallel computing system.

FIG. 1 is a schematic 100 that illustrates an example implementation of an optimal touch estimate system, for example, on a host-based parallel computing system. The various functional blocks illustrated in FIG. 1, and also in FIGS. 7-10, represent components or modules that perform certain functionality, for example, they may contain instructions that configure or operate a processor to perform a certain method for determining touch position estimation processing. Such a system may include new touch sensor processing algorithms with demonstrated improved performance. The system provides new ways to implement the improved algorithm using parallel processing available on today's touch hosts, including array processor (such as Neon), DSP, and graphics engine supporting OpenCL and CUDA.

As illustrated in FIG. 1, the system receives a touch panel input 105 of a user. The touch panel input 105 may include a plurality of data points. The system may contain a component configured to downsample 110 the plurality of data points and provide them to a component that determines a center of mass estimate for coarse objects 115 and provides a coarse object final estimate 120. In the system illustrated in FIG. 1, the plurality of data points (touch panel input 105) is also provided to a fine object detection component, which also receives an input of downsampled data where the coarse object has been removed 125 (for example, by the center of mass estimate for coarse objects 115 component) and uses such inputs to perform fine object detection 130. A multi-processor 135 receives information from the fine object detection component and provides an optimal fine object estimate 140, as illustrated.

Some of the embodiments described herein may have the characteristics that the estimated centroid will be unbiased even as a touch probe moves off the edge of a touch panel. Also, some embodiments may be distinguished by having an odd number of touch sensors in either the send or the receive direction, rather than an even number. For example, a number of touch sensors may be placed such that there are N finger sensors (in either the send or receive directions) that are evenly 4 mm+/−1 mm apart. If M sensors are then inserted between each of the N finger sensors, a total number of sensors N+M*(N−1) may be present. Accordingly, this may result in an odd number of total sensors as long as at least one of N or M is an odd number.

The following is an example of a problem which embodiments of the current invention may address. A panel surface may measure the two-dimensional (2D) capacitance at many points on its surface. Thus, a high capacitance touch probe at location $(x_0+y_0)$ on the panel surface imposes may a 2D kernel function on the capacitance measurement of the surface. The measurement of such a touch probe may be represented by Equation 1:

$$c(x,y)=k(x-x_0,y-y_0)+n \qquad \text{Eqn. 1}$$

where $c(x,y)$ is the measurement of the touch probe, $k(x,y)$ is the kernel function representing the touch probe on the capacitive surface, $x_0$ is the location of the touch and $n$ is a noise term. For simplicity, and without loss of generality, we may simplify this equation by considering only the one dimensional (1D) case. In the one-dimensional case, Equation 1 becomes:

$$c(x)=k(x-x_0)+n \qquad \text{Eqn. 2}$$

Figure 2:
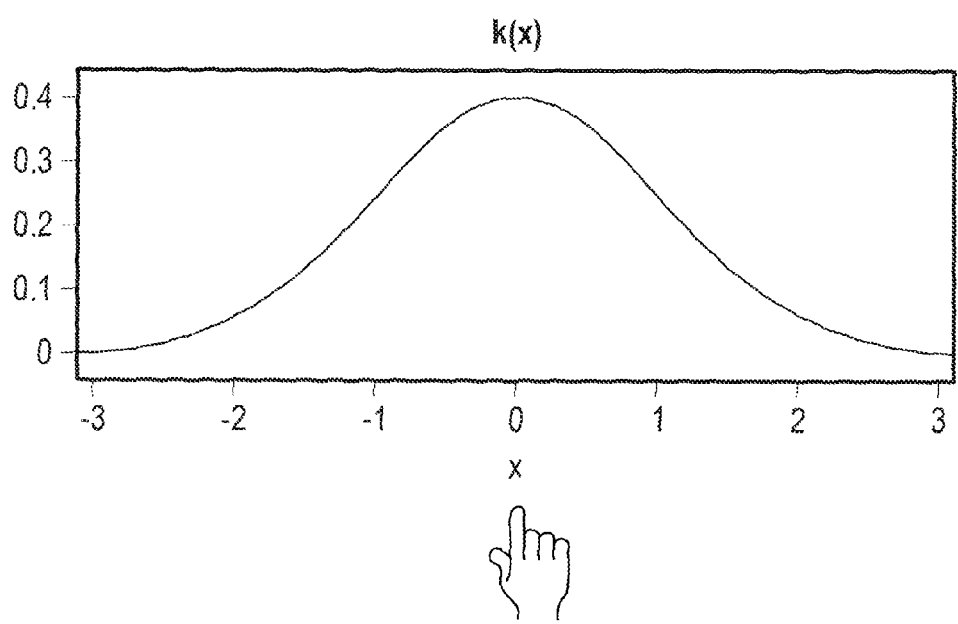
FIG. 2 illustrates a graph showing an example of a "probe" touch at location $x_0=0$ imposing a kernel function on the measurement, where in this example $k(x)=(2\pi)^{-1/2}e^{-x**2}$.

FIG. 2 illustrates a graph showing an example of a "probe" touch at location $x_0=0$ imposing a kernel function on the measurement, where in this example the kernel function is $$k(x) = 2\pi^{-\frac{1}{2}} e^{-x^2}.$$

The problem which touch processing seeks to address is how to estimate the touch location $x_0$ based on the measurements $C=\{c(x_i), i=0 \ldots N\}$.

Some Issues of Conventional Touch Processing

Conventional touch processing looks at the kernel function as the "mass" of a touch probe, and estimates $x_0$ using the center of mass formula, aka "centroid" estimate:

$$\hat{x}_{0,centroid} = \frac{\Sigma_i x_i C(x_i)}{\Sigma_i C(x_i)} \qquad \text{Eqn. 3}$$

Another view of the conventional touch processing algorithm is that it is the "centroid" of a k-means algorithm. However, this view results in a formula which is also identical to that shown above in Equation 3.

If $c(f)$ is the Fourier transform of the observation, then we have:

$$\hat{x}_{0,centroid} = \text{Const} \cdot C'(f=0) \qquad \text{Eqn. 4}$$

where Const is a constant term and $C'(f)$ is the derivative of the Fourier transform of the observation function.

Three major limitation of conventional touch processing include (1) suboptimal determination, (2) aliasing, and (3) low processing power, described further below. All three of these limitations may be addressed and substantially minimized with systems and methods described and illustrated herein.

Suboptimal determination: The kernel function is a capacitance or inverse capacitance measurement, not a mass measurement or a k-means centroid. Therefore the assumptions of Eqn. 3 are incorrect. In particular, for large objects the center part quickly reach the value of infinite plate capacitance regardless of the mass behind the object. Thus, for example, a touch from a user may activate a number of sensors. However, while the sensors in the middle of a touch may be pressed harder (with more force) than those at the edge, a high number of the sensors—not just those in the center—may reach their maximum capacitance. Thus, the center of mass estimation may not have enough information to optimally determine the center of the mass, as most or all of the sensors may have reached their maximum capacitance.

Aliasing: As seen in Eqn. 4, aliasing occurs if the Fourier transform becomes corrupt at f=0. This aliasing occurs if the sampling in the x-domain is less than the Nyquist frequency. For many signal processing applications, sampling must occur at least as often as 2*Nyquist (sampling at half of Nyquist frequency), as this frequency may be required to avoid aliasing at all part of the spectrum, and not just at the f=0 component. However, even sampling at the more generous full Nyquist frequency may result in aliasing in conventional touch processing.

Low Processing Power: Conventional touch processing is typically implemented in a low-powered microprocessor. Such low-power microprocessors may be capable of simpler formulas, such as the center of mass formula in Eqn. 3. However, if a better method for touch processing is developed which requires, for instance, matched 2D filtering against a kernel function, then these microprocessors may not have the computational power to handle the improved algorithms, and may not be able to implement the algorithm with good power efficiency.

Discussion of Maximum Likelihood Touch Processing

Monte Carlo simulation may be used to study maximum likelihood estimates. For the purpose of the following Monte Carlo simulation, we assume in Eqn. 2 that the kernel function in 1D space is Gaussian, with a width factor of w shown in Eqn. 5:

$$k(x) = e^{-(x-x_0)^2/w} \qquad \text{Eqn. 5}$$

Furthermore we assume that n is independently identically distributed (IID) Gaussian with variance shown in Eqn. 6:

$$c(x_i) = k(x_i) + N(0, \sigma^2) \qquad \text{Eqn. 6}$$

For this Monte Carlo simulation, a one-dimensional touch panel may be set up with sensors at x values of x=−2, −1, 0, 1 and 2. Based on these Monte Carlo simulations, a number of plots may be prepared, includes FIGS. 3-6. In these plots, the true position is shown in the x-axis, while the expected value of the estimate is shown in the y-axis. These plots illustrate the differences between various methods of estimating a touch location.

In each of these plots, the expected value of the conventional centroid estimate is indicated by a line including star symbols. An error bar of +/−1 standard deviation is also included on the plot. The Maximum Likelihood Estimation is indicated by a line which includes circle symbols. Again, an error bar of +/−1 standard deviation is also included on the plot. Finally, a straight line is also included on the plot. An unbiased estimation should fall on this straight line.

Figure 3:
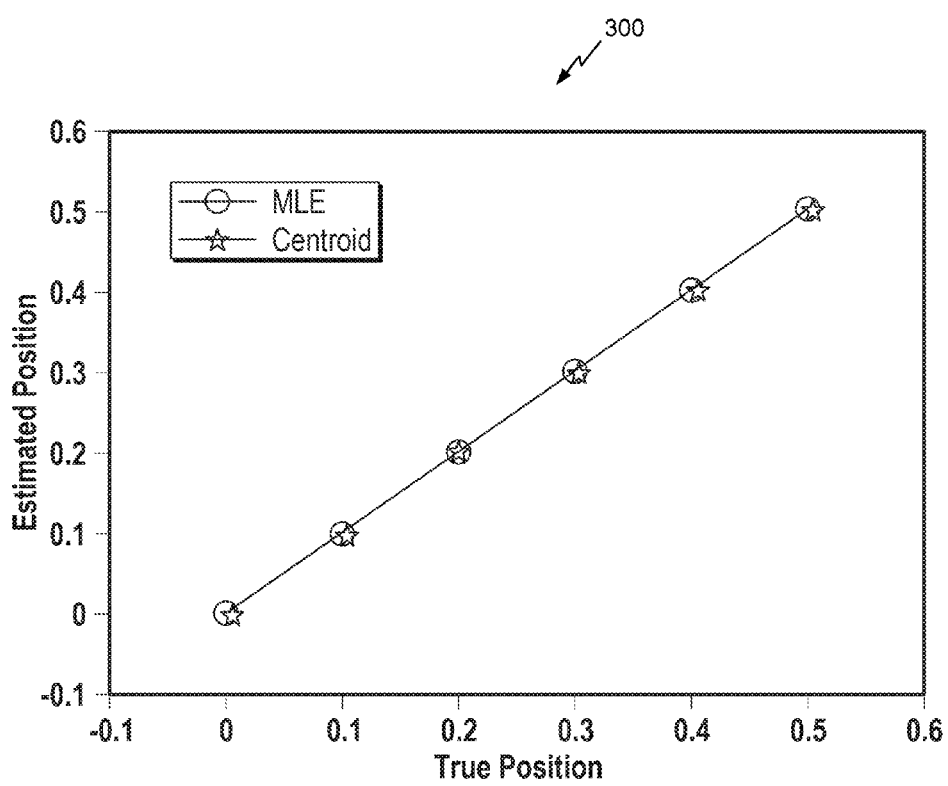
FIG. 3 illustrates an example of a graph of estimated position of a touch on a touch sensor as a function of true position of the touch, with W=1.0 and SNR=25.0 db.

FIG. 3 illustrates a graph 300 of estimated position of a touch on a touch sensor as a function of true position of the touch. In this example, for a width of W=1, and with a signal-to-noise ratio of SNR=25, we see the MLE estimate and the conventional center of mass (centroid) estimate both provide unbiased estimate with low jitter. Accordingly, with this width of a touch and with this signal-to-noise ratio, both techniques may work well.

Figure 4:
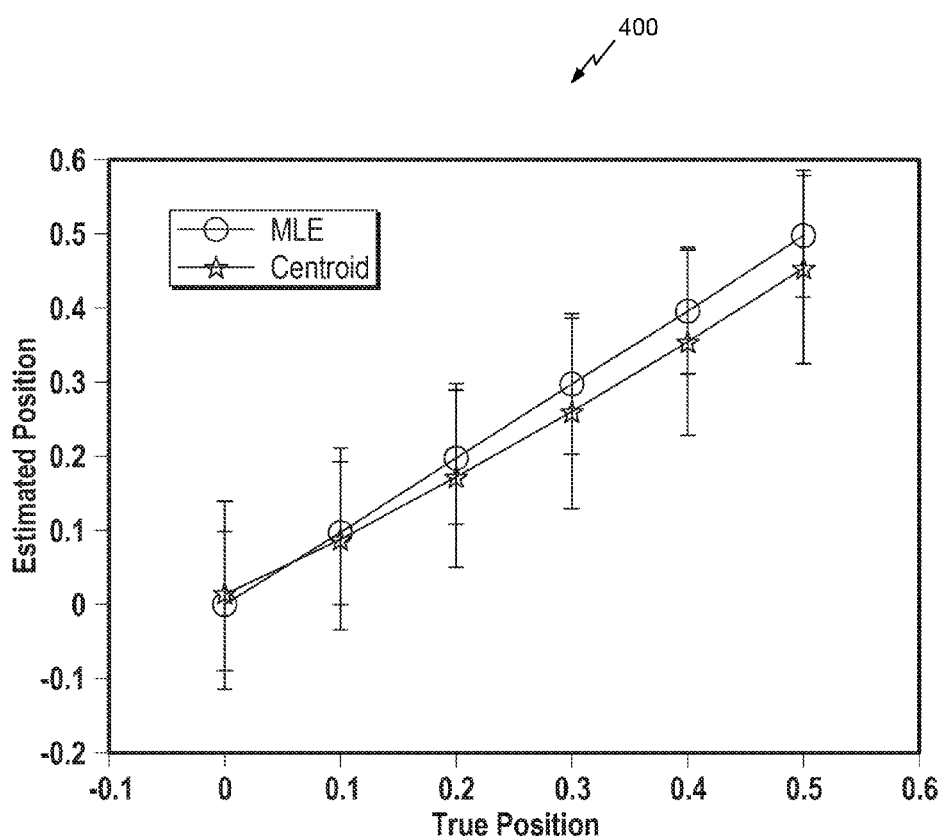
FIG. 4 illustrates an example of a graph of estimated position of a touch on a touch sensor as a function of true position of the touch with the same conditions as in FIG. 3, except that the SNR is lowered from 25 db to 10 db.

FIG. 4 illustrates a graph 400 of estimated position of a touch on a touch sensor as a function of true position of the touch with the same conditions as in graph 300, except that the signal-to-noise ratio has been lowered from 25 db to 10 db. In graph 400, the error bars for the MLE estimate are smaller than those from the conventional center of mass (centroid) estimate. This indicates that the MLE estimate includes significantly less jitter than the center of mass estimate. Further, the MLE estimate is unbiased, as it stays on the straight line, while the center of mass estimate is biased and strays away from the straight line.

Figure 5:
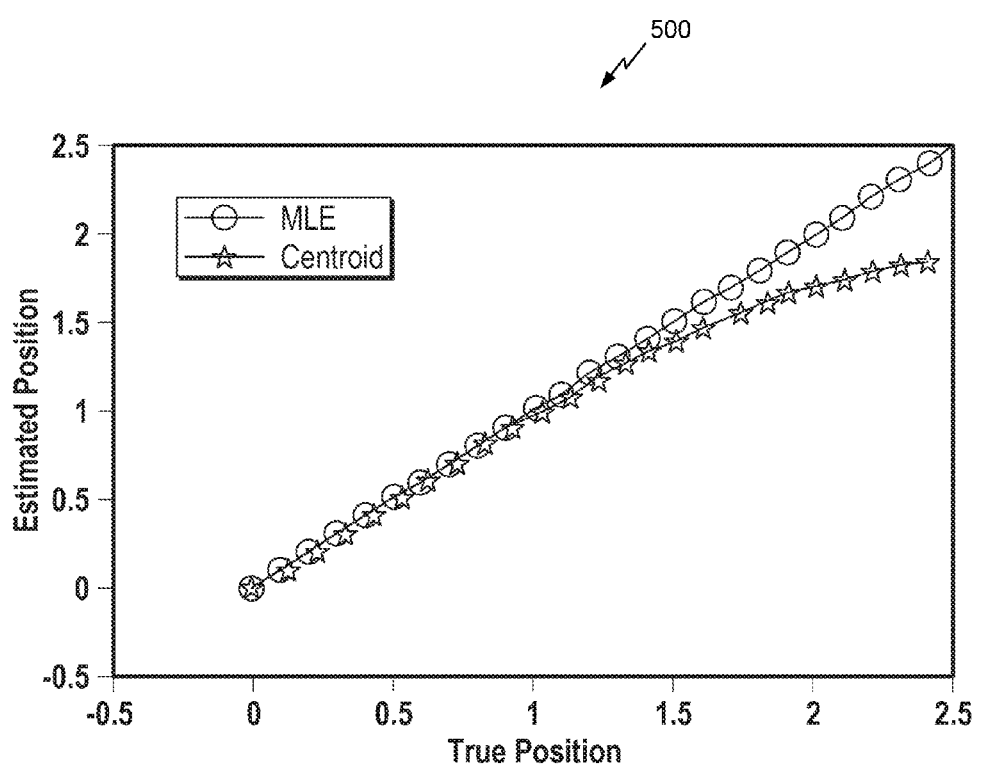
FIG. 5 illustrates another example of a graph of estimated position of a touch on a touch sensor as a function of true position of the touch, with W=1.0 and SNR=25.0 db.

FIG. 5 illustrates another example of a graph 500 of estimated position of a touch on a touch sensor as a function of true position of the touch, with width W=1.0 and a signal-to-noise ratio of SNR=25.0 db, as in graph 300. However, graph 500 extends the position from x=0 all the way to x=2.5. Since the right-most touch sensor is at true position x=2, this means that the centroid estimate is not capable of estimating centroids beyond that limit. However, the centroid estimate exhibits and edge bias well before the true edge at x=2. As illustrated in graph 500, the MLE provides a solution to the edge bias problem.

Figure 6:
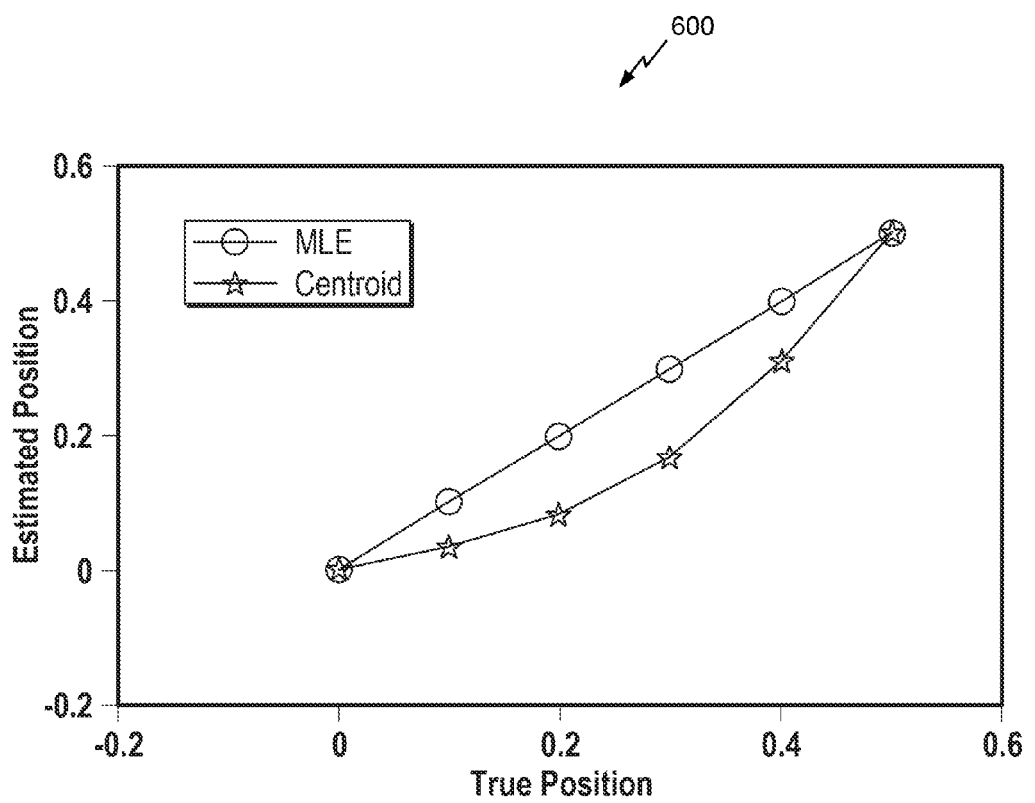
FIG. 6 illustrates another example of a graph of estimated position of a touch on a touch sensor as a function of true position of the touch, with W=1.0 and SNR=25.0 db, where the width (the W parameter) of the kernel is reduce do to 0.25.

FIG. 6 illustrates another example of a graph 600 of estimated position of a touch on a touch sensor as a function of true position of the touch, with a signal-to-noise ratio of SNR=25.0 db, where the width (the W parameter) of the kernel is reduced to 0.25. With this thinner kernel, the special sampling frequency discussed above with regards to the Nyquist frequency may no longer be sufficient to avoid aliasing. Because of this thinner kernel, bias will result in the conventional center of mass estimate. Although both MLE and center of mass (centroid) estimates have low variances, the conventional center of mass (centroid) estimate will result additional inaccuracy due to bias. Accordingly, graph 400, graph 500, and graph 600 all illustrated exemplary situations in which the MLE technique performs significantly better than conventional center of mass techniques.

Certain Solutions to Optimal Touch Processing

The solution of the maximum likelihood equation depends on the assumptions which are made. In the Monte Carlo simulations above, since the noise is independent and identically distributed (IID) Gaussian, the maximization equation (the log likelihood equation with constants removed) is shown in Eqn. 8:

$$l(c \mid x_0) = \sum_i (c(x_i) - k(x_i))^2 \qquad \text{Eqn. 8}$$

In certain domain conditions, the $\Sigma_i c(x_i)^2$ and the $\Sigma_i k(x_i)^2$ terms can drop out from Eqn. 8, and we're left with the matched filter shown in Eqn. 9:

$$l(c \mid x_0) = -2 \sum_i c(x_i) k(x_i) \qquad \text{Eqn. 9}$$

However, the conditions which may allow the equation to be simplified in this manner may not exist in a 2D touch panel with a small number of sensors in the x- and y-directions. Further, when using a parallel computing environment, it isn't clear if the equation of Eqn. 8 is more problematic than the matched filter equation of Eqn. 9. Accordingly, such simplifications, in some aspects, may not be necessary.

In a host processor based implementation of touch processing, it may be advantageous to limit the bandwidth of data from the sensor analog controller front-end (AFE) to the host processor by limiting the number of bits transmitted. In this case, the earlier Gaussian noise approximation may become suboptimal. Thus, it may be beneficial to consider the optimal touch detector for a Poisson and binomial noise environment. For the Poisson case, we have probability distribution function for an observation shown in Eqn. 10:

$$p(C \mid x_0) = \frac{e^{-(n+k(x_i))}(n+k(x_i))^{c(x_i)}}{c(x_i)!}, \; c(x_i) = 0, 1, 2, \ldots \qquad \text{Eqn. 10}$$

where n is the background noise level. In this case the maximizing equation (log likelihood with constant terms removed) is shown in Eqn. 11:

$$l(C \mid x_0) = \Sigma_i (c(x_i) \ln(n + k(x_i)) - \ln(c(x_i)!)) \qquad \text{Eqn. 11}$$

The problem with the Poisson distribution is that there is a probability of overflow where $c(x_i)$ is greater than the maximum value for a limited bandwidth transmission line. In some aspects, the probability of this occurring may be low, but at certain times, this probability may be significant, such as when a strong source contacts the touch panel. For example, such a source might include an AC line or an electrostatic discharge. Accordingly, a distribution function which can better accommodate these limiting probabilities is the multinomial distribution.

However, an optimal solution of a multinomial maximum likelihood cannot be determined without a model of the kernel function in binomial space. For example, we may solve a simplified case as a prototype demonstrating how the binomial MLE may be applied.

For example, suppose $c(x_i)$ may be an integer value from 0 to M−1, for some number of symbols M. Further, suppose that the following conditional probability is true:

$$p(c(x_i)|k(x_i)) = \{p \text{ for } c(x_i) = k(x_i),$$

$$\{q \text{ for } c(x_i) \ne k(x_i), \qquad \text{Eqn. 12}$$

where p>0, q>0, and p+(M−1)q=1. If these conditions are true, then:

$$p(C|X_0) = \binom{N}{n_0 n_1 \ldots n_{M-1}} p^{Nequal} q^{Nnotequal} \qquad \text{Eqn. 13}$$

Where $n_s$, s=0, 1, . . . M−1 is the number time symbol s is observed, Nequal is the number of times $c(x_i)$ equals $k(x_i)$, and Nnotequal is number of times $c(x_i)$ does not equal $k(x_i)$. Based on these assumptions, the maximizing function (log likelihood with constant terms removed) is then given by:

$$l(C|x_0) = Nequal \cdot \ln p + Nnotequal \cdot \ln q \qquad \text{Eqn. 14}$$

Kernel Function Estimation

When applied to the capacitive touch, one problem with MLE solutions such as Equations 8, 11, and 14, is that the system may not work unless the touch kernel function (such as $k(x)=(2\pi)^{-1/2} e^{-x^{**}2}$ in FIG. 2) can be estimated with very high precision. Accordingly, one may not see the performance improvement seen in the Monte Carlo experiments of FIGS. 4, 5, and 6. Finding the right kernel function may be difficult due to a number of reasons, such as variations in physical panels from the same manufacturing batch of touch panels, variations between different styluses and fingers, and even variations within different stylus positions. Accordingly, it may be beneficial to resolve the problem of real-time kernel function estimation in order to implement a practical MLE solution. A number of possible solutions to this problem may be used, and the following systems have produced working results.

Fixed Stylus: A fixed stylus may mean that a particular stylus is paired with a given touch panel, and always used with that touch panel. For example, a manufacturer may include and require the use of a particular stylus with a device, such as a particular stylus or pencil lead. In the case of a fixed stylus, a detailed Kernel function can be measured using a robot to measure each sensor's response.

Based on each sensor's response, a response map may be generated. The response map can be generated by using the target (fixed) stylus to measure response on a 2×2 mm square around one or more sensors at a density of 0.01 mm between each measurement in both the x- and y-directions. This may be referred to as a "0.01 mm density kernel" for that probe. In this kernel estimate the stylus may contact the touch panel at a right angle (90 degrees) between the stylus and the touch panel.

Further, the 0.01 mm density kernel may be generated for the same panel at different angles between the stylus and the touch panel. This may reveal different response maps, based upon the different angles of the same stylus contacting the same touch panel.

After generating 0.01 mm density kernels for both the 90-degree angle scenario and for one or more other angles, such as 45 degrees, it may be desired to find a transformation which may move the kernel function of a 90-degree stylus to that of an angled stylus. For example, 2D low-pass spline filtering may be used to find a best approximate transformation for the kernel.

Different touch panels may have different RC time constants than each other. For example, this may be caused by variations in manufacturing of different panels. Because of these RC time constant differences, different touch panels may have different kernel functions. Thus, for each new panel, it may be beneficial to generate a sparse 0.1 mm kernel function (this kernel function is sparse relative to the 0.01 mm kernel function above). Next, using 2D low-pass spline filtering may be used to create factory-based touch-panel specific kernels for each panel based on the sparse 0.1 mm kernel function and the high-density 0.01 mm kernel function above.

Fixed Unknown Probes: In some aspects, some touch screens may not be designed for some specific stylus or probe. For example, some touch screens may be intended to be used by a user's finger. A user's touch may vary from one touch to the next, and from one user to the next. Further, each touch screen itself may have some level of variation in manufacturing, which may result in different kernels. However, even in a system that does not have a specific probe that it is designed for, it is still possible to obtain improved performance over centroid estimates by using a bank of several known kernel functions. For example, these kernel functions may be generated as above, but using different types of input, such as different fingers (or things simulating fingers) and different styluses. Accordingly, a number of such kernel functions may be stored, such that the stored kernel functions may improve performance over centroid estimation. Generally, incorrect kernel functions may have spurious spikes, while a correct kernel function may be smooth leading up to the stylus location when approached from the top, bottom, left and right.

Certain Implementations of an Optimal Touch Processing System

Based upon the above three optimal solutions (Eqn. 8, 11 and 14), it may be observed that these typical MLE solutions may include a large amount of local computation that cannot be efficiently implement on a touch control microprocessor, but that these equations may be well-suited to parallel processing. While some may observe that the optimal solution to the multinomial problem given in Eqn. 14 is relatively simple, this is only because Eqn. 12 made an unrealistically simplifying equation. In a more realistic modeling of a touch kernel function, such as a multinomial observation with more noise, this will yield MLE solutions with computational complexity on the order of the Gaussian (Eqn. 8) and Poisson (Eqn. 11) examples above. The present disclosure includes a few key implementations which may aid the efficiency of touch processing, such as when a parallel computation element is used.

Parallel Search after Center of Mass Estimation

Figure 7:
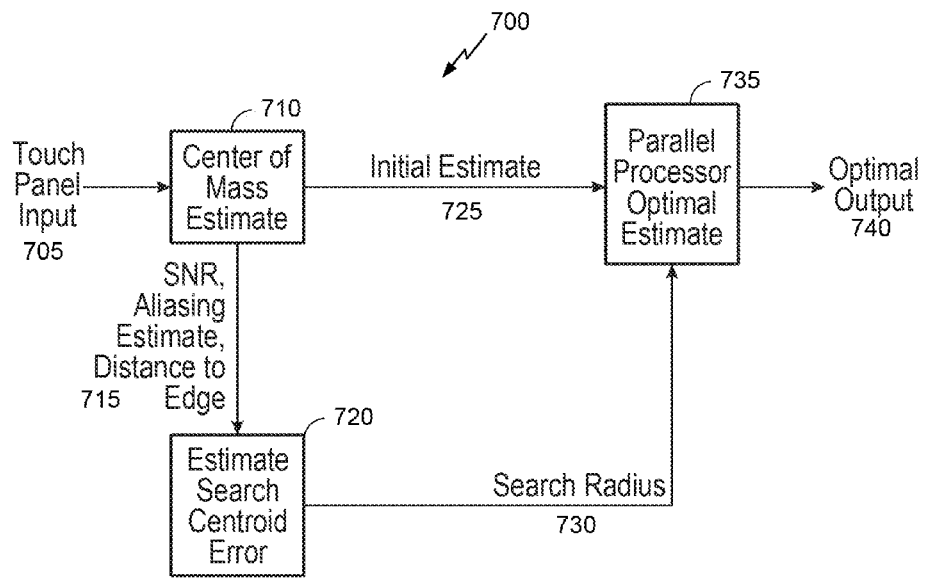
FIG. 7 is a block diagram that illustrates an implementation of a system that is configured to determine an optimal touch output from a touch panel signal input.

FIG. 7 is a block diagram 700 that illustrates an implementation of a system which is configured to determine an optimal touch output from a touch panel signal input. First, a touch panel input 705 may be received. For example, the touch panel input may be received by a touch processor or by a parallel computation element which is configured to receive a touch panel input 705. Based upon the touch panel input 705, a center of mass estimate 710 may be determined. This determination may be done using the techniques described above, such as by using Equation 3 to calculate a center of mass of the received touch inputs, and may represent a first set in determining an optimal touch output. In some aspects, Equation 3 may also be used to calculate a center of mass using downsampled touch inputs. This may reduce the number of computations needed in order to use Equation 3.

After determining the center of mass estimate 710, the system may also receive or determine a signal-to-noise ratio of the touch panel input 705, an estimate of the aliasing of the touch panel input 705, and the distance from the touch to the edge of the panel 715. This information may be used to estimate a search centroid error 720. As seen in FIGS. 3-6, it may not be very computationally difficult to estimate the search radius given the SNR, aliasing, and closeness to the edge. Depending upon the input data, a search may or may not be needed in order to determine the search radius 730. Both the initial estimate of the center of mass 725 and the search radius 730 as estimated from the search centroid error 720 may be transmitted to a parallel processor for the parallel processor to determine a parallel processor optimal estimate 735. For example, this estimate may be made using a maximization equation such as that shown in Equation 8, 11, or 14. Finally, this optimal estimate may be the output 740 of the system. In some aspects, the optimal estimate can be computed via a parallel CPU in a touch host system, including an array processor such as ARM Neon, DSP, and OpenCL-enabled graphics system.

Reduced Bandwidth Search after Center of Mass Estimation

Figure 8:
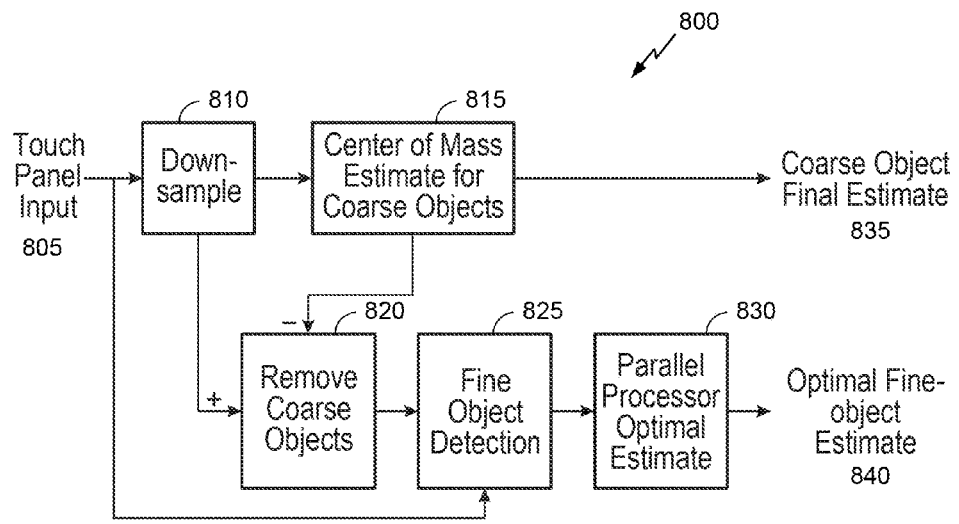
FIG. 8 is a block diagram that illustrates another implementation of a system that is configured to determine an optimal touch output from a touch panel signal input, where reduced total computation is achieved when the touch panel input is first downsampled and processed using conventional center of mass estimation for "coarse objects."

FIG. 8 is a block diagram 800 which illustrates another implementation of a system that is configured to determine an optimal touch output from a touch panel signal input 805. In this system, total computation may be reduced by downsampling the touch panel input and by processing using conventional center of mass estimation for "coarse objects." Course objects are large objects that have high SNR and no aliasing effects. The behavior of the conventional center of mass algorithm on "course objects" is typically that shown in graph 300, and is the same as the optimal estimate. Accordingly, using the center of mass technique on these objects may not cause a loss of information or biasing/aliasing difficulties, and may be computationally simpler than using an MLE technique for such objects.

However, "fine objects", such as thin stylus, pencil, object shape, and fingerprint, have greater need for optimal estimates. Accordingly, the course object may be first removed from the touch space, and then "fine object detection" is applied on the high resolution touch panel input using optimal methods.

In block diagram 800, the touch panel input 805 may be downsampled 810. This may help reduce the computational complexity of the operations following this downsampling. For example, downsampled data may include only a limited number of the touch panel input 805. For example, downsampled data may include only every fourth touch panel input 805, or some other fraction. In some aspects, this downsampling may be done in an even manner, such that each portion of the screen is downsampled in the same manner. For example, downsampling may have the effect of reducing the native resolution of the touch panel input 805. However, as discussed above, due to the nature of coarse inputs, downsampling may not have much of an effect on a center of mass estimate for coarse objects. Thus, the downsampled touch data may be used for a center of mass estimate for course objects 815. This center of mass estimate may be made using the downsampled data and using Equation 3. This may be used to estimate a "center of mass" of the touch input, based upon the relative "weight" and the location of each received touch input, or each downsampled touch input. Based on the center of mass estimate for coarse objects and on the downsampled touch data, course objects may be removed 820 from the downsampled data. For example, the center of mass estimate may be used to determine a center of mass on a touch screen. Based upon the noise in the received touch inputs, a radius around the center of mass may be determined. Touch inputs that are within this radius may be said to be coarse objects, and may thus be removed from the downsampled data. Accordingly, based on the downsampled data with coarse objects removed and based on the original touch panel input 805 (without downsampling), fine objects may be detected 825. For example, the original touch panel input 805 may be analyzed to determine areas in which there was input (apart from the noise in the signal) that was not near the center of mass. Such inputs may be said to be fine objects, rather than coarse objects, due to their distance from the center of mass and their weight and size. Based on these fine objects, parallel processing may be used 830 to determine an optimal fine-object estimate 840. Accordingly, this method may return both a course object final estimate 835 and an optimal fine-object estimate 840. This fine-object estimate may be done, as described above, using an equation such as any of Equations 8, 11, and 14.

Sensor Placement:

In some aspects, it may be desired to place sensors in certain ways, such as at certain distances from each other. For course object detection, the human fingertip may be modeled by a 6 mm to 10 mm diameter circle. Accordingly, the touch sensor pitch after downsampling should be about 4 mm apart, in order to avoid aliasing in the center of mass computation. If the number of sensors in either the sense or receive direction is N, then the upsampled size is achieved by inserting M sensors between each of the N course object sensors. Therefore the total number of sensors after upsampling in this manner will satisfy Eqn. 15 below:

$$n\text{SensorsInOneDirection}=N+M^*(N-1) \qquad \text{Eqn. 15}$$

where N is the number of course object sensors that are 4 mm+/−1 mm apart, and M is the number of sensors inserted between each of the N course object sensors.

Figure 9:
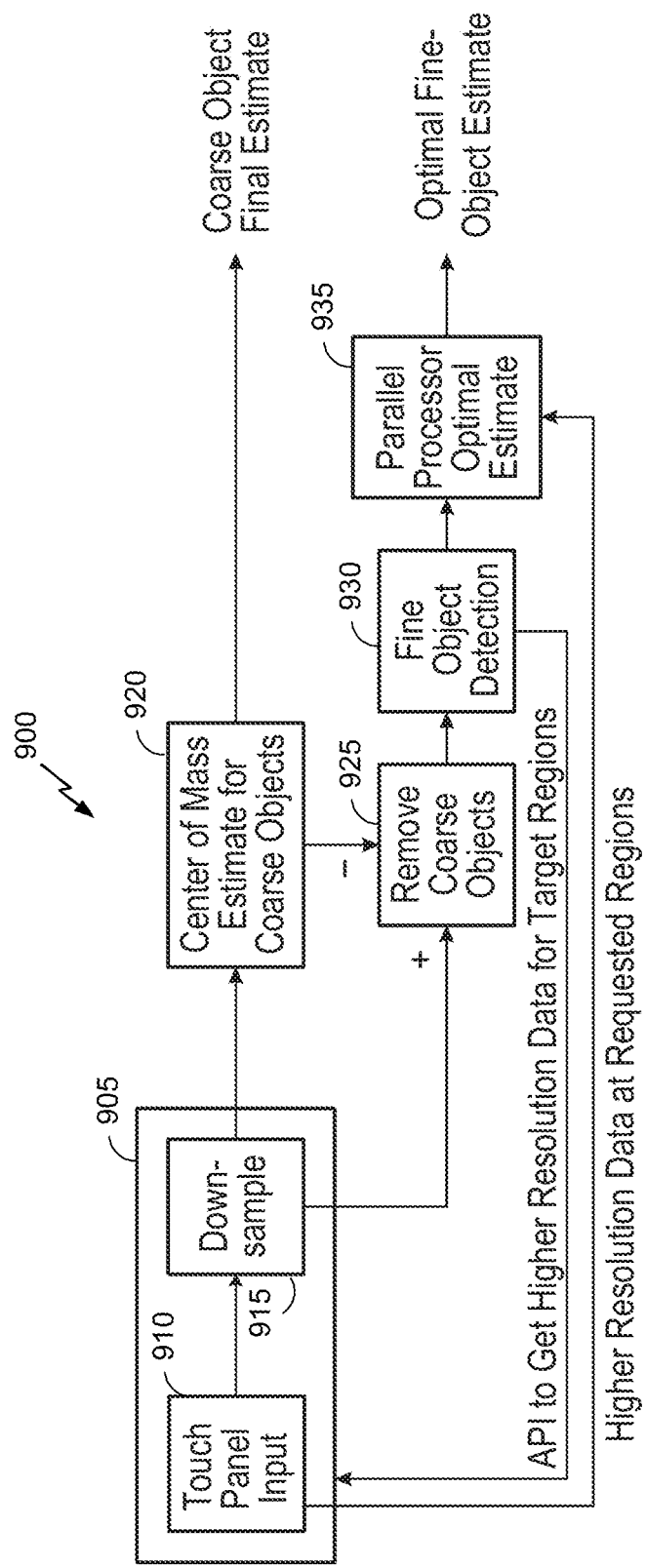
FIG. 9 is a block diagram that illustrates another implementation of a system that is configured to determine an optimal touch output from a touch panel signal input, where the input may be downsampled at a touch panel analog front-end (AFE) with an AFE API to fetch higher resolution touch input.

Downsample at a Touch Panel Analog Front-End (AFE) with AFE API to Fetch Higher Resolution Touch Input FIG. 9 is a block diagram 900 that illustrates another implementation of a system 900 that is configured to determine an optimal touch output from a touch panel signal input, where the input 910 may be downsampled 915 at a touch panel analog front-end (AFE) 905 with an AFE API to fetch higher resolution touch input. This downsampled data may be used to perform a center of mass estimate for coarse objects 920, which may calculate the center of mass of all touches on the touch display, based on the downsampled data. In this embodiment, computation is reduced for "course object" location estimation but the bandwidth between the touch panel and host processor has not been reduced. In this embodiment, the touch panel's AFE 905 provides downsampled data. Coarse objects may be removed 925 from the data set, based on the downsampled data and the center of mass estimate. For example, coarse objects may be removed by determining the center of mass, and by removing all touches within a certain vicinity of this center of mass. If the host processor determines that fine objects exist in certain regions using fine object detection 930, it may send a command to the touch panel requesting specific regions where fine-resolution data is required. For example, this higher resolution data may be received for regions other than a region around the center of mass. The detection of fine objects may be used, together with the center of mass estimate for coarse objects, to product a parallel processor optimal estimate 935. This may result in increased computational complexity and processing delays in the system design, but may greatly reduce the data bandwidth. The sensor placement requirements, discussed above, can apply to this embodiment.

Figure 10:
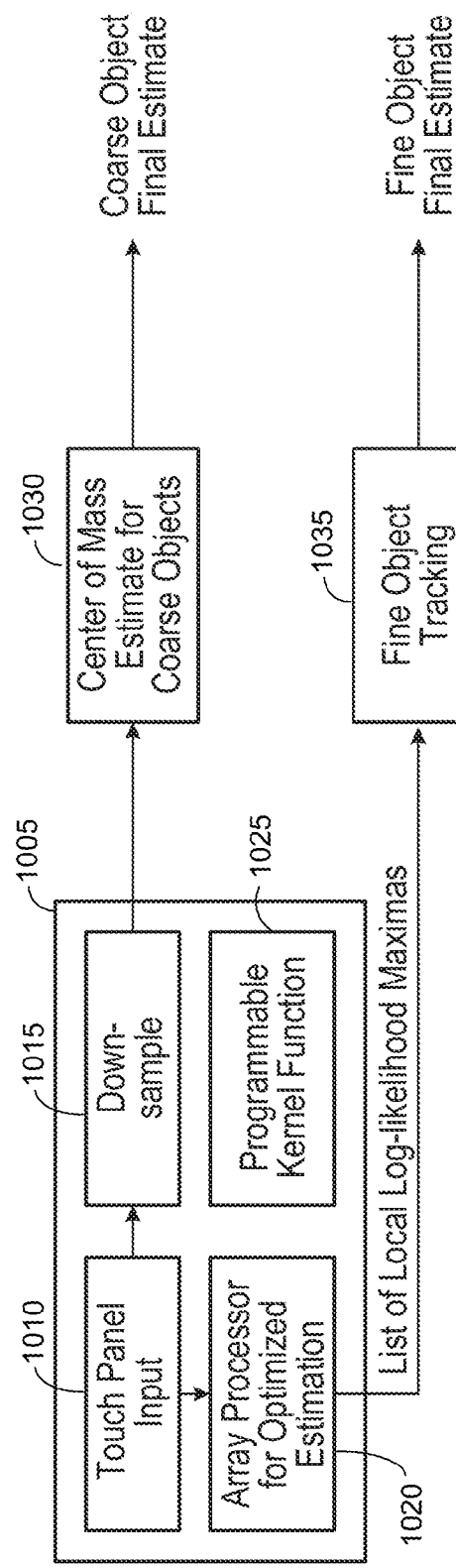
FIG. 10 is a block diagram that illustrates another implementation of a system that is configured to determine an optimal touch output from a touch panel signal input and produce a coarse object final estimate and a fine object final estimate.

FIG. 10 is a block diagram that illustrates another implementation of a system that is configured to determine an optimal touch output from a touch panel signal input and produce a coarse object final estimate and a fine object final estimate. This embodiment may include hardware array processing at a touch panel analog front-end (AFE) 1005 for optimized fine object detection. In this embodiment, like the embodiment illustrated in FIG. 9, the touch panel AFE 1005 may provide downsampled touch outputs. For example, the AFE 1005 may receive touch panel input 1010, and may downsample 1015 that touch panel input. In the embodiment illustrated in FIG. 10, the optimal search is done by specialized hardware inside the touch Analog Front End (AFE) 1005, such as an array processor for optimized estimation 1020. In the illustrated embodiment, the AFE may include functionality components Touch Panel Input 1010 coupled to Downsample 1015, which then provides information to the Center of Mass Estimate for Coarse Objects 1030 component, which may be configured to, as above, estimate a center of mass for all touch inputs received, which may have been downsampled. The Touch Panel Input 1010 component is also coupled to an Array Processor for Optimized Estimation 1020 component, which provides a list of local log-likelihood maximas to a Fine Object Tracking Component 1035. The AFE 1005 may also include a programmable kernel function 1025. Whereas other embodiments implement parallel processing inside the "host," which can be a cell/tablet SOC such as a Qualcomm Snapdragon chip. Here the AFE 1005 includes the ability to upload a kernel function. The optimization function is performed in the AFE 1005 using hardware array processor. To save bandwidth, the AFE 1005 will output only a list of local maximas. The final decision on whether or not a fine object exist, and its location, is made at the host-based processor (the block labeled "fine object tracking" 1035. The sensor placement requirements, discussed above, can apply to this embodiment.

In some aspects, Maximum Likelihood Estimator (MLE) may be a promising candidate to improve the accuracy of touch localization of centroid estimates for a touch panel. Analysis of touch signals has shown that the noise in a touch signal typically follows the additive Gaussian noise model well. Further, experimental results show that a Gauss kernel with appropriate parameters is well-suited to model the sensor response around a touch point. Nevertheless, there are still several issues that need to be addressed before in order to be able to use such a MLE.

One issue with the MLE approach is that experimental results have shown that the Gaussian kernel is tilted for fitting the touch signal. In other words, the variance in the horizontal direction and in the vertical direction is different. Thus, when a Gaussian kernel with inaccurate parameters is used to fit the data, obvious bias may be observed on the estimation result. From this, it may be learned that one drawback of MLE may be that MLE is very sensitive to kernel shape.

Another issue with the MLE approach is that different styluses may be used on a given touch screen. Further, other objects such as pens or pencils may also be used as a stylus on a touch screen. Each of these various touch devices may be treated by the touch processing system as the stylus, based on observations of the touch area of each of these tools. Accordingly, the MLE model used should not be specific to the unique stylus, as it must be able to cope with a diverse number of possible styluses or other tools applied to the touch screen and still produce accurate results.

A third issue with the MLE approach is that different people may hold the same stylus differently from each other. Further, the same person may hold the stylus differently when doing different tasks, such as when writing compared to when drawing. The most obvious difference between different users may be strength, such that some users exert more or less force than other users. A bigger issue than this, however, may be the shadowing effect where a user's fingers or hand may rest upon the touch screen or come close to the touchscreen. The shadowing effect may vary a lot from one individual to another as the angle between the stylus and the touch screen varies. Accordingly, an MLE approach must be equipped to deal with these differences in shadowing as well.

Generally, in order to reduce the computational complexity of MLE, a method for calculating an MLE estimate may be based on searching within an area centered at the centroid estimate. In some aspects, MLE may only be used some of the time in order to reduce computational complexity. For example, MLE may be used only when it is most likely to improve localization accuracy of a touch point, as compared to the accuracy of a centroid estimate based upon, for example, a measure of error in each metric. Further, the kernel and/or the MLE estimator may be adapted in order to fit varying signals caused by differences in the tools used (such as different styluses or other touch instruments) and differences in the person using the tool. Accordingly, it may be useful to define a measurement which can differentiate between good and bad MLE estimates. One possible measurement is to define an upper bound of the mean square error (MSE), as MLE degenerates into MSE under an assumption of Gaussian noise. For example, this upper bound, which may be used as a threshold to differentiate quality estimates from noise, may be determined as a sum of expected MSE caused by noise, and a threshold for buffering. The MSE expectation caused by noise only may be calculated by the average MSE between consecutive idle touch frames. For example, the noise in consecutive frames may be analyzed to determine the mean square error that this noise may be expected to cause.

Further, the touch system may need to keep a table for commonly-used kernels. This table should typically include a few commonly-used styluses with different known angles. Generally, including a large number of different styluses and angles may be advantageous, however, this may increase computational complexity significantly. Accordingly, due to the limits of computational complexity, the system may not be able to cover all possible angles. Instead, the system may provide several angles, which combined may give a reasonable amount of resolution of candidate kernels for a particular touch.

When a touch is detected, the touch system may perform a centroid estimate of the touch location. Following this, an exhaustive search may be performed around the touch point (as determined by the centroid estimate). For example, each of the candidate MLE models may be stored in a maintained table, and each model may be used to attempt to determine a touch location. For each of these MLE models, a MSE may be determined. The model which has the lowest MSE may be selected as a good candidate. The MSE of the model with the lowest MSE may be compared to a threshold. If the MSE is larger than this threshold, the centroid estimate may be used rather than the MLE model, which may help avoid "overshooting" in the removal of bias from the centroid estimate.

Regardless of whether the system uses an MLE model or the centroid estimate, the touch system may also be configured to build an adaptive model. This adaptive model may assume a Gaussian model, and may use an estimated covariance matrix via weighted sample estimates, using the data from the first frame that a touch is detected until the current frame. Note that the distance between a touch and the nearest touch sensor may vary from one frame to another. Thus, a good estimate of the peak value of the kernel may be based on a maximum sensor response so far, minus a reasonable multiple of the standard deviation of the noise in the system. A MSE may be calculated for the adaptive model, similar to the MSE calculated for the other models. The MSE of the adaptive model may be compared to the MSE of the best (for example, least error) MLE model and the MSE of the centroid estimate. When the adaptive model has an MSE which is better than that of the MLE model and the centroid model, the adaptive model may be stored in the table. Until this time, the table may be kept the same as it was prior, and the adaptive model may not be stored in the table. Because the table may be limited by storage capacity, models which have the least chance of selection may be removed from the table when the table is full and a new model is being stored. For example, models which produce very high MSE or which have been selected very few times may be removed in favor of newer adaptive models.

One advantage of MLE is that MLE may be effective at coping with shadowing effects, such as when a user's hand is close to the screen as a user is using a stylus. Generally, shadowing with add a tail in a specific direction (such as the direction of the user's hand) on a particular areas of the screen which will show a higher response than noise. The amplitude of this tail may be a bit higher than random noise, but may be significantly smaller than the response of sensors which are close to the touch point. Thus, MLE estimators are much more likely to find a better estimate for a touch position than centroid estimates, which will be skewed by this tail. For example, a centroid estimate may be off because the shadowing effect is likely to only occur on one side of the touch point, which may throw off the centroid estimate. However, using an MLE method, these outliers may be removed based on a distance calculation from the touch point in order to improve the accuracy of the touch location.

Figure 11:
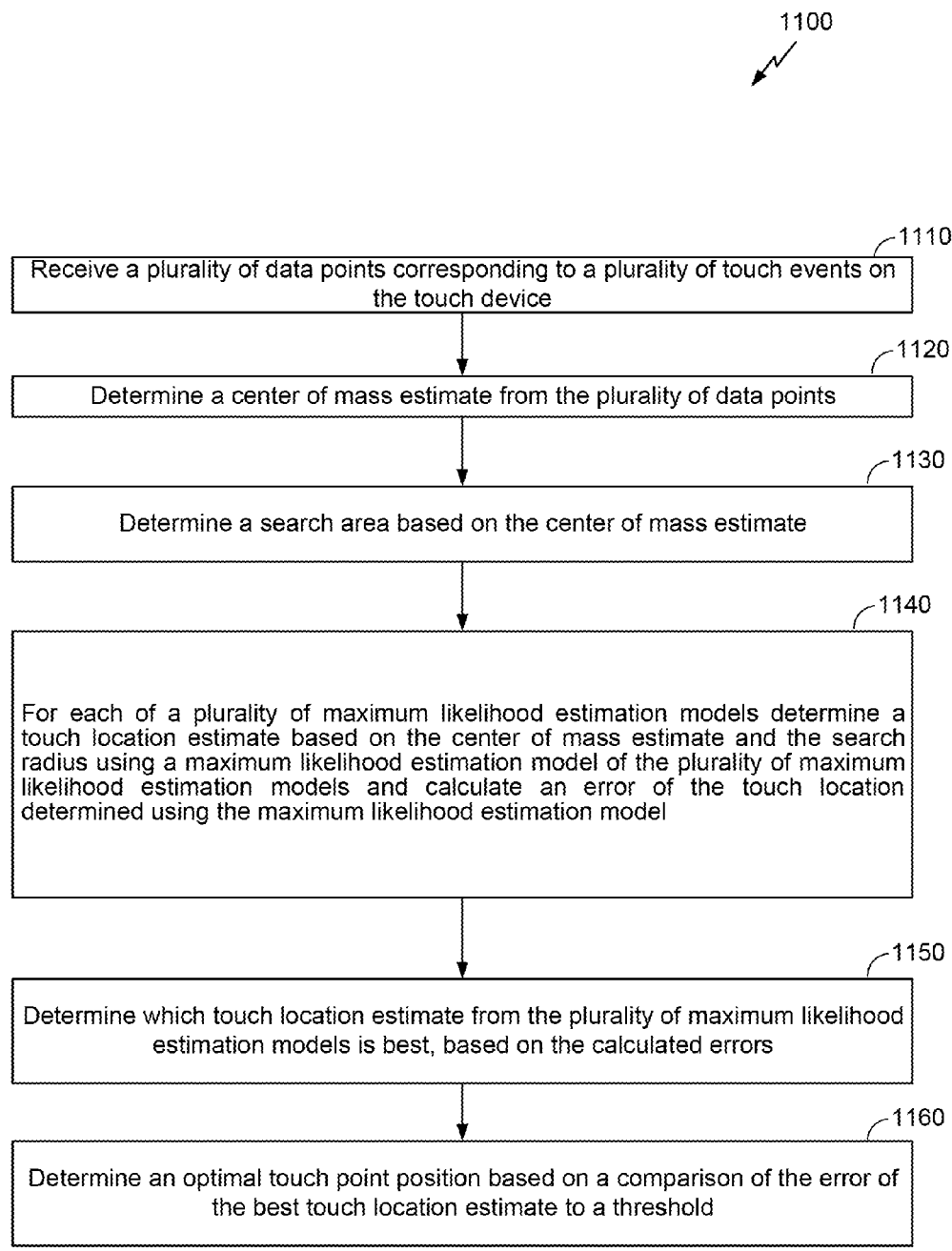
FIG. 11 illustrates an exemplary method of determining an optimal touch point position based on aspects of the present disclosure.

FIG. 11 illustrates an exemplary method 1100 of determining an optimal touch point position based on aspects of the present disclosure. This method may be used by a device, such as a touch device, in a processor or a touch processor of the device, in order to more accurately determine a touch location based on inputs received from a touch screen.

At block 1110, the method receives a plurality of data points corresponding to a plurality of touch events on the touch device. For example, the method may receive indications from each of a number of touch pixels on a touch screen, which indicates whether those pixels have been touched, and to what amount. In some aspects, the means for receiving the plurality of data points may include a processor.

At block 1120, the method determines a center of mass estimate from the plurality of data points. For example, each of the data points may be used to determine a "weight," based on the force exerted upon that particular location of the screen. Accordingly, these weights may be averaged in order to form a center of mass estimate of the touch location on the touch screen. In some aspects, the means for determining this may include a processor.

At block 1130, the method determines a search area based on the center of mass estimate. This search radius may, for example, be centered on the center of mass estimate location on the touch screen. The search area may be a circle centered upon that location of the touch screen. The radius of the circle may, for example, be a fixed value or a fixed proportion of the screen. In some aspects, the radius of the circle may be based on a calculated amount of noise in the received signal. For example, when there is more noise in the received signal (the plurality of data points), it may be beneficial to use a larger search radius. In some aspects, the means for determining a search area may include a processor.

At block 1140, for each of a plurality of maximum likelihood estimation models, the method determines a touch location estimate based on the center of mass estimate and the search radius using a maximum likelihood estimation model of the plurality of maximum likelihood estimation models and calculates an error of the touch location determined using the maximum likelihood estimation model. For example, the error may include a mean square error value, as discussed above. Each of the MLE models may be stored in a table. In some aspects, the means for determining a touch location and calculating an error may be a processor.

At block 1150, the method determines which touch location estimate from the plurality of maximum likelihood estimation models is best, based on the calculated errors. In other words, the method selects a touch location estimate from the plurality of maximum likelihood estimation models based on the calculated errors. In other words, based on which of the touch location estimates from the plurality of maximum likelihood estimation models has the lowest calculated error. For example, each of the calculated errors may be compared to one another, and the MLE estimate which produces the lowest error may be determined to be the best touch location estimate (for example, having the lowest determined error). In some aspects, the means for determining may include a processor.

At block 1160, the method determines an optimal touch point position based on a comparison of the error of the best touch location estimate to a threshold. For example, this comparison may determine that the optimal touch point position is either the MLE estimate position, or the centroid estimate position, based on comparing their relative error levels. In some aspects, the means for determining may include a processor.

Figure 12:
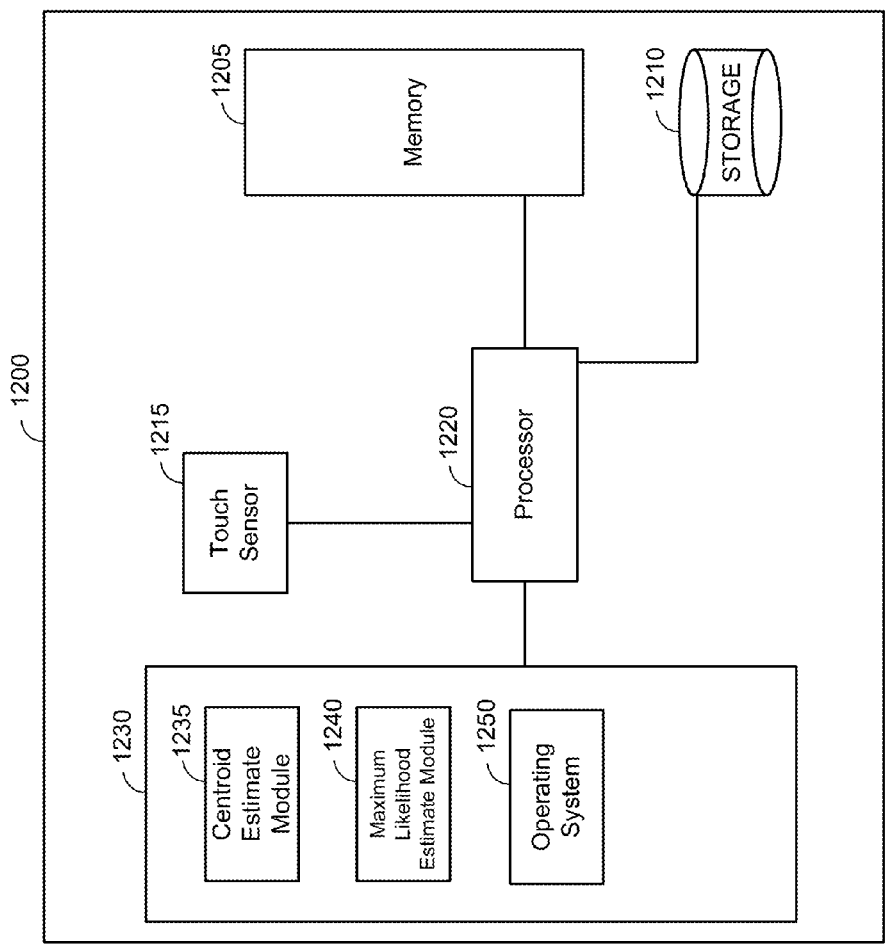
FIG. 12 depicts a high-level block diagram of a device having a set of components including a processor operatively coupled to an touch sensor.
Figure 13:
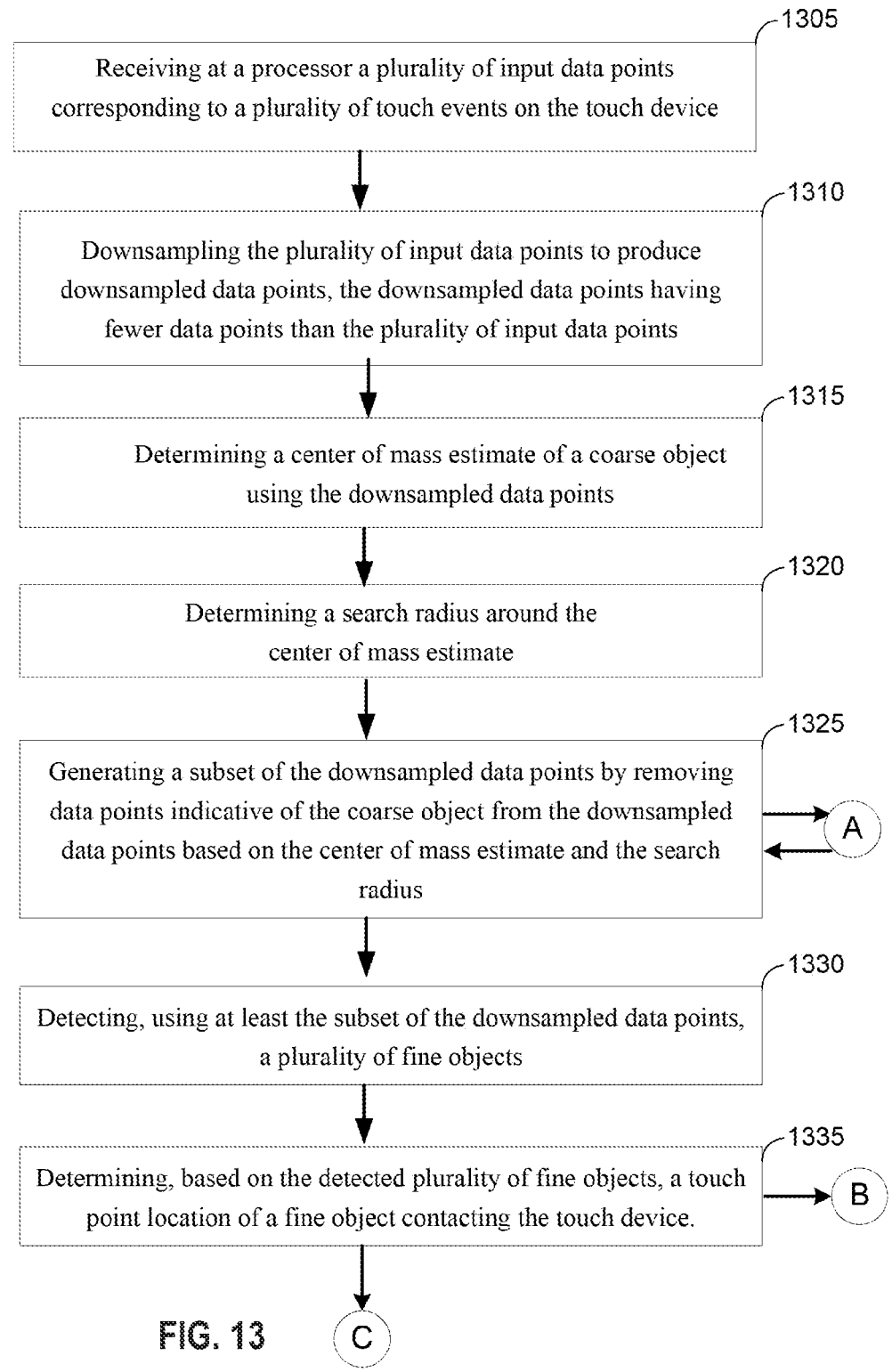
FIG. 13 is a block diagram that illustrates certain features of a process of determining a touch point location of a fine object contacting the touch device.
Figure 16:
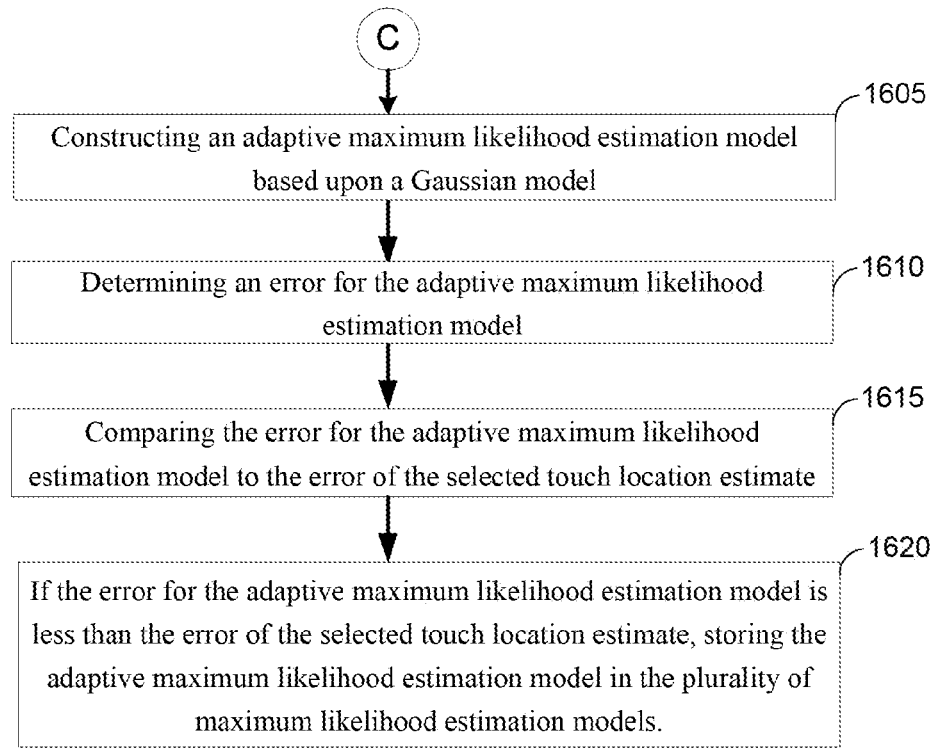
FIG. 16 is a block diagram that illustrates certain features of a process of determining a touch point location of a fine object contacting the touch device, the process relating to the method of FIG. 13.
Figure 17:
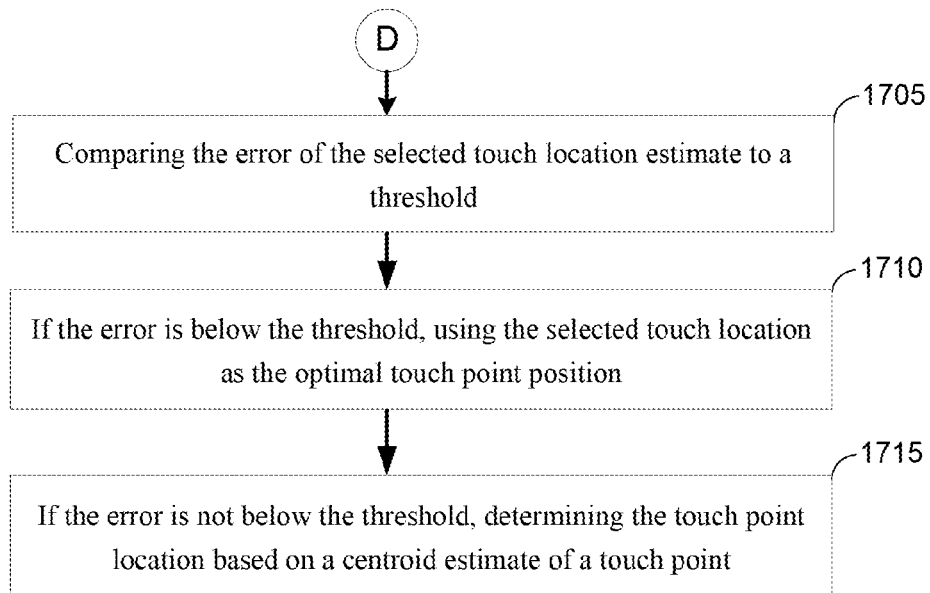
FIG. 17 is a block diagram that illustrates certain features of a process of determining a touch point location of a fine object contacting the touch device, the process relating to the method of FIG. 13.

FIG. 12 depicts a high-level block diagram of a device 1200 having a set of components including a processor 1220 operatively coupled to an touch sensor 1215. A working memory 1205, storage 1210, and memory 1230 are also in communication with and operative attached to the processor. Device 1200 may be a device configured to receive touch inputs, and to determine a location of those touch inputs. For example, device 1200 may be a device with a touch screen, such as a computer, a laptop computer, a digital camera, a mobile phone, a tablet computer, or another device.

The touch sensor 1215 may be configured to capture or receive a number of touch inputs, such as inputs on a touch screen. Each of these inputs may be associated with a location on the screen, and with a particular pressure on the screen. The touch sensor 1215 may be coupled to the processor (or "touch processor") 1220. The processor 1220 may be configured to perform various operations on received touch inputs in order to calculate a position of the touch input.

Processor 1220 may be a general purpose processing unit or a processor specially designed for the disclosed methods. As shown, the processor 1220 is connected to a memory 1230 and a working memory 1205. In the illustrated embodiment, the memory 1230 stores centroid estimate module 1235, maximum likelihood estimation module 640 and operating system 650. These modules include instructions that configure the processor to perform various tasks. Working memory 1205 may be used by processor 1220 to store a working set of processor instructions contained in the modules of memory 1230. Alternatively, working memory 1205 may also be used by processor 1220 to store dynamic data created during the operation of device 1200.

As mentioned above, the processor 1220 is configured by several modules stored in the memories. For example, the centroid estimate module 1235 may include instructions that configure the processor 1220 to determine a center of mass estimate based upon a number of receive touch inputs. For example, each input may have a location and may also include some indication of pressure. Accordingly, a center of mass estimate may use this information to calculate a "center of mass" of a particular touch. The centroid estimate module 1235 may include instructions that configure the processor 1220 to determine such an estimate.

The memory 1230 may also contain a maximum likelihood estimate module 1240. The maximum likelihood estimate module 1240 may contain instructions that configure the processor 1220 to determine a touch location based on a number of receive touch inputs, and based on a search radius. This search radius may be determined based on the center of mass estimate provided by the centroid estimate module 1235.

Operating system module 1250 configures the processor to manage the memory and processing resources of device 1200. For example, operating system module 1250 may include device drivers to manage hardware resources such as the image sensor 1215 or storage 1210. Therefore, in some embodiments, instructions contained in modules discussed above may not interact with these hardware resources directly, but instead interact through standard subroutines or APIs located in operating system component 1250. Instructions within operating system 1250 may then interact directly with these hardware components.

Processor 1220 may write data to storage module 1210. While storage module 1210 is represented graphically as a traditional disk device, those with skill in the art would understand multiple embodiments could include either a disk based storage device or one of several other type storage mediums to include a memory disk, USB drive, flash drive, remotely connected storage medium, virtual disk driver, or the like.

FIG. 12 depicts a device having separate components to include a processor, and memory, one skilled in the art would recognize that these separate components may be combined in a variety of ways to achieve particular design objectives. For example, in an alternative embodiment, the memory components may be combined with processor components to save cost and improve performance.

Additionally, although FIG. 12 shows two memory components, to include memory component 1230 having several modules, and a separate memory 1205 having a working memory, one with skill in the art would recognize several embodiments utilizing different memory architectures. For example, a design may utilize ROM or static RAM memory for the storage of processor instructions implementing the modules contained in memory 1230. Alternatively, processor instructions may be read at system startup from a disk storage device that is integrated into device 1200 or connected via an external device port. The processor instructions may then be loaded into RAM to facilitate execution by the processor. For example, working memory 1205 may be a RAM memory, with instructions loaded into working memory 1205 before execution by the processor 1220.

The various illustrative logics, logical blocks, modules, circuits and algorithm steps described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and steps described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular steps and methods may be performed by circuitry that is specific to a given function.

In one or more aspects, the functions and processes described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The steps of a method, algorithm or manufacturing process disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blue-ray disc where disks usually reproduce data magnetically, while discs reproduce data optically with lasers. Combinations of the above also may be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein. The word "exemplary" is used exclusively herein to mean "serving as an example, instance, or illustration." Any implementation described herein as "exemplary" is not necessarily to be construed as preferred or advantageous over other possibilities or implementations. Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of an IMOD as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, a person having ordinary skill in the art will readily recognize that such operations need not be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. An apparatus for processing a touch input signal, comprising:
   a processor;
   a touch panel configured to receive touch inputs; and
   a memory, operably connected to the processor, and configured to store processor instructions that configure the processor to perform a method including
      receiving a plurality of input data points corresponding to a plurality of touch events on the touch panel,
      downsampling the plurality of input data points to produce downsampled data points, the downsampled data points having fewer data points than the plurality of input data points;
      determining a center of mass estimate of a coarse object using the downsampled data points;
      determining a search radius around the center of mass estimate;
      generating a subset of the downsampled data points by removing data points indicative of the coarse object from the downsampled data points based on the center of mass estimate and the search radius;
      detecting, using at least the subset of the downsampled data points, a plurality of fine objects; and
      determining, based on the detected plurality of fine objects, a location of a fine object contacting the touch panel.

2. The apparatus of claim 1, wherein removing data points indicative of the coarse object comprises removing from the downsampled data points touch inputs that are within the search radius.

3. The apparatus of claim 1, wherein the processor is further configured to determine the location of the fine object contacting with the touch panel by:
   for each of a plurality of maximum likelihood estimation models:
      determining a touch location estimate based on the center of mass estimate and the search radius using a maximum likelihood estimation model of the plurality of maximum likelihood estimation models;
      calculating an error of the touch location estimate determined using the maximum likelihood estimation model;
   selecting a touch location estimate from the plurality of maximum likelihood estimation models based on the calculated errors; and
   determining a touch point position of the fine object based on a comparison of the error of the selected touch location estimate to a threshold.

4. The apparatus of claim 3, wherein the processor is further configured to perform a method comprising:
   constructing an adaptive maximum likelihood estimation model based upon a Gaussian model;
   determining an error for the adaptive maximum likelihood estimation model;
   comparing the error for the adaptive maximum likelihood estimation model to the error of the selected touch location estimate; and
   if the error for the adaptive maximum likelihood estimation model is less than the error of the selected touch location estimate, storing the adaptive maximum likelihood estimation model in the plurality of maximum likelihood estimation models.

5. The apparatus of claim 3, wherein determining the touch point position of the fine object based on comparing the error of the selected touch location estimate to the threshold comprises:
   comparing the error of the selected touch location estimate to a threshold;
   if the error is below the threshold, using the selected touch location estimate as the optimal touch point position; and if the error is not below the threshold, determining the touch point position of the fine object based on a centroid estimate of a touch point.

6. The apparatus of claim 3, further comprising determining the search radius based on determining an estimate of a search centroid error of the center of mass.

7. The apparatus of claim 6, wherein the processor instructions further configure the processor to determine an estimate of a search centroid error of the center of mass using a signal-to-noise ratio of the touch panel.

8. The apparatus of claim 6, wherein the processor instructions further configure the processor to determine an estimate of a search centroid error of the center of mass using an aliasing estimate of the touch panel.

9. The apparatus of claim 6, wherein the processor instructions further configure the processor to determine an estimate of a search centroid error of the center of mass using distance to edge data of the touch panel.

10. The apparatus of claim 6, wherein the processor instructions further configure the processor to determine an estimate of a search centroid error of the center of mass based on a signal-to-noise ratio of the touch panel, an aliasing estimate of the touch panel and distance to edge data of the touch panel.

11. The apparatus of claim 10, wherein the processor instructions further configure the processor to downsample the received plurality of data points before determining the center of mass estimate.

12. The apparatus of claim 1, wherein the processor includes a plurality of microprocessors.

13. A method of processing a touch input signal, the method comprising:
  receiving at a processor a plurality of input data points corresponding to a plurality of touch events on the touch panel,
  downsampling the plurality of input data points to produce downsampled data points, the downsampled data points having fewer data points than the plurality of input data points;
  determining a center of mass estimate of a coarse object using the downsampled data points;
  determining a search radius around the center of mass estimate;
  generating a subset of the downsampled data points by removing data points indicative of the coarse object from the downsampled data points based on the center of mass estimate and the search radius;
  detecting, using at least the subset of the downsampled data points, a plurality of fine objects; and
  determining, based on the detected plurality of fine objects, a touch point location of a fine object contacting the touch panel.

14. The method of claim 13, wherein removing data points indicative of the coarse object comprises removing, from the downsampled data points, touch inputs that are within the search radius.

15. The method of claim 13, wherein determining the touch point location of the fine object comprises:
  determining a touch location estimate based on the center of mass estimate and the search radius using a maximum likelihood estimation model of the plurality of maximum likelihood estimation models;
  calculating an error of the touch location estimate determined using the maximum likelihood estimation model;
  selecting a touch location estimate from the plurality of maximum likelihood estimation models based on the calculated errors; and
  determining the touch point location of the fine object contacting the touch panel based on a comparison of the error of the selected touch location estimate to a threshold.

16. The method of claim 15, further comprising:
  constructing an adaptive maximum likelihood estimation model based upon a Gaussian model;
  determining an error for the adaptive maximum likelihood estimation model;
  comparing the error for the adaptive maximum likelihood estimation model to the error of the selected touch location estimate; and
  if the error for the adaptive maximum likelihood estimation model is less than the error of the selected touch location estimate, storing the adaptive maximum likelihood estimation model in the plurality of maximum likelihood estimation models.

17. The method of claim 15, wherein determining the touch point location of the fine object contacting the touch panel based on a comparison of the error of the selected touch location estimate to a threshold comprises:
  comparing the error of the selected touch location estimate to a threshold;
  if the error is below the threshold, using the selected touch location as the optimal touch point position; and
  if the error is not below the threshold, determining the touch point location based on a centroid estimate of a touch point.

18. The method of claim 15, further comprising determining the search radius based on determining an estimate of a search centroid error of the center of mass.

19. The method of claim 18, wherein determining an estimate of a search centroid error of the center of mass comprises using a signal-to-noise ratio of the touch panel.

20. The method of claim 18, wherein the processor instructions further configure the processor to determine an estimate of a search centroid error of the center of mass using an aliasing estimate of the touch panel.

21. The method of claim 18, wherein determining an estimate of a search centroid error of the center of mass comprises using distance to edge data of the touch panel.

* * * * *